United States Patent
Lakshmanan et al.

(10) Patent No.: US 11,145,046 B2
(45) Date of Patent: Oct. 12, 2021

(54) DETECTION OF NEAR-FIELD OCCLUSIONS IN IMAGES

(71) Applicant: THE REGENTS OF THE UNIVERSITY OF MICHIGAN, Ann Arbor, MI (US)

(72) Inventors: Sridhar Lakshmanan, Belleville, MI (US); Christopher Bargman, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/520,780

(22) Filed: Jul. 24, 2019

(65) Prior Publication Data
US 2020/0034959 A1   Jan. 30, 2020

Related U.S. Application Data

(60) Provisional application No. 62/702,408, filed on Jul. 24, 2018.

(51) Int. Cl.
*G06T 7/00* (2017.01)
*H04N 17/00* (2006.01)
(Continued)

(52) U.S. Cl.
CPC ......... *G06T 7/0002* (2013.01); *H04N 5/2258* (2013.01); *H04N 9/0451* (2018.08);
(Continued)

(58) Field of Classification Search
CPC ......... G06T 7/0002; G06T 2207/30252; G06T 2207/30168; G06T 2207/20081;
(Continued)

(56) References Cited

U.S. PATENT DOCUMENTS

| | | | | |
|---|---|---|---|---|
| 8,619,082 B1 * | 12/2013 | Ciurea | ................. | H04N 13/243 345/427 |
| 8,797,531 B2 * | 8/2014 | Knox | ................. | G01N 15/1434 356/337 |

(Continued)

OTHER PUBLICATIONS

Kenji Mori, et al., Visibility Estimation in Foggy Conditions by In-Vehicle Camera and Radar, IEEE Computer Society, 2006.
A. Emir Dirik, et al., Source Camera Identification Based on Sensor Dust Characteristics, IEEE, 2007, 6 pages.
Changyin Zhou & Stephen Lin, Removal of Image Artifacts Due to Sensor Dust, IEEE Conference on Computer Vision and Pattern Recognition, Jun. 2007, 8 pages.
(Continued)

*Primary Examiner* — John W Miller
*Assistant Examiner* — Humam M Satti
(74) *Attorney, Agent, or Firm* — Harness, Dickey & Pierce, P.L.C.

(57) ABSTRACT

A method is presented for detecting occlusions on a color camera. The method includes: capturing an image of a scene using the camera; analyzing intensity of electromagnetic radiation forming the at least one image, where the intensity of the electromagnetic radiation is analyzed across the electromagnetic spectrum; detecting an occlusion on a lens of the camera based on variation of intensity of the electromagnetic radiation across the electromagnetic spectrum; and tagging the image with an indicator of the occlusion, where the tagging occurs in response to detecting an occlusion on the camera.

14 Claims, 4 Drawing Sheets

(51) Int. Cl.
  *H04N 5/225* (2006.01)
  *H04N 9/09* (2006.01)
  *H04N 9/04* (2006.01)

(52) U.S. Cl.
  CPC .............. *H04N 9/09* (2013.01); *H04N 17/002* (2013.01); *G06T 2207/10024* (2013.01); *G06T 2207/20081* (2013.01); *G06T 2207/30168* (2013.01); *G06T 2207/30252* (2013.01)

(58) Field of Classification Search
  CPC ........... G06T 2207/10024; G06T 5/002; G06T 2207/20182; H04N 17/002; H04N 5/2258; H04N 9/09; H04N 9/0451; H04N 5/217; H04N 5/2173; H04N 5/357; H04N 5/3572; H04N 5/35721; H04N 5/3575; H04N 5/363; H04N 5/3651; H04N 5/3653; H04N 5/3658; H04N 9/04517; H04N 9/04519; G06K 9/40
  See application file for complete search history.

(56) References Cited

U.S. PATENT DOCUMENTS

| | | | |
|---|---|---|---|
| 2003/0193604 A1* | 10/2003 | Robins ................. | H04N 5/2254 348/335 |
| 2016/0280229 A1* | 9/2016 | Kasahara ............. | H04N 5/2354 |
| 2018/0114089 A1* | 4/2018 | Ikeda ...................... | B60R 1/00 |
| 2018/0114092 A1* | 4/2018 | Huang ................. | G06T 7/0002 |

OTHER PUBLICATIONS

Bin Liao & Wei Mo, Dirt Detection on Camera Module using Stripe-Wise Background Modeling, Conference Paper, Oct. 2016, 6 pages.

David Eigen, et al., Restoring an Image Taken Through a Window Covered with Dirt or Rain, IEEE International Conference on Computer Vision, Dec. 2013, 8 pages.

John R. Smith & Shih-Fu Chang, Tools and Techniques for Color Image Retrieval, IS&T/SPIE Proceedings vol. 2670, Storage & Retrieval for Image and Video Databases IV, Feb. 1996, 10 pages.

Chih-Wei Chen & Chiou-Shann Fuh, Lens Shading Correction for Dirt Detection, Pattern Recognition, Machine Intelligence and Biometrics, pp. 171-195 Jan. 2011, 28 pages.

Frédérique Crété-Roffet, et al., The Blur Effect: Perception and Estimation with a New No-Reference Perceptual Blur Metric, HAL, Feb. 1, 2008, 12 pages.

Chih-Wei Hsu, et al., A Practical Guide to Support Vector Classification, URL: https://www.csie.ntu.edu.tw/~cjlin/papers/guide/guide.pdf, 2003, 16 pages.

Shigeo Abe, On Invariance of Support Vector Machines, URL: http://www2_kobe-u.ac.ip/~abe/pdf/ideal2003.pdf, Jan. 2003, 8 pages.

Bernard Haasdonk & Hans Burkhardt, Invariant Kernel Functions for Pattern Analysis and Machine Learning, Machine Learning, Jul. 2007, vol. 68, Issue 1, pp. 35-61.

Dennis Decoste & Bernhard Schölkopf, Training Invariant Support Vector Machines, Machine Learning, Jan. 2002, vol. 46, Issue 1-3, pp. 161-190.

\* cited by examiner

DETECTION OF NEAR-FIELD OCCLUSIONS IN IMAGES

CROSS-REFERENCE TO RELATED APPLICATIONS

This application claims the benefit of U.S. Provisional Application No. 62/702,408, filed on Jul. 24, 2018. The entire disclosure of the above application is incorporated herein by reference.

FIELD

The present disclosure relates to a system and methods for detecting near-field occlusions in images captured by a camera.

BACKGROUND

Cameras, among other imaging technologies, have become a field of continually growing interest for many industries. As our society continues the push for machine control of everyday tasks with growing interest in autonomous vehicles, facial recognition, UAVs, DSLR cameras, etc. the need to distinguish a clean picture from one with an obstruction on the lens is becoming more critical than ever. Although many methods exist for capturing and monitoring the environment around a vehicle, determining whether the object being seen by the vehicle is an occlusion on the lens or not has remained relatively unstudied. When near-field occlusions impede the ability of a camera to accurately capture a scene, the resulting images are corrupted. Downstream processing of corrupted images becomes problematic and the collateral effect includes the failure of software applications that rely upon the corrupted images as input. When an image is occluded, the occlusion might corrupt all or some portion of the image.

Thus, there is a need for improved techniques for detecting near-field occlusions in images captured by cameras.

This section provides background information related to the present disclosure which is not necessarily prior art.

SUMMARY

This section provides a general summary of the disclosure, and is not a comprehensive disclosure of its full scope or all of its features.

A method is presented for detecting occlusions on a color camera. The method includes: capturing an image of a scene using the camera; analyzing intensity of electromagnetic radiation forming the at least one image, where the intensity of the electromagnetic radiation is analyzed across the electromagnetic spectrum; detecting an occlusion on a lens of the camera based on variation of intensity of the electromagnetic radiation across the electromagnetic spectrum; and tagging the image with an indicator of the occlusion, where the tagging occurs in response to detecting an occlusion on the camera.

More specifically, the intensity of the electromagnetic radiation is analyzed by comparing the intensity of electromagnetic radiation in one frequency band to the intensity of electromagnetic radiation in the other two frequency bands, and detecting an occlusion of the lens of the camera when the intensity of electromagnetic radiation in the one frequency band is similar to the intensity of electromagnetic radiation in the other two frequency bands.

In one embodiment, the intensity of electromagnetic radiation is compared by designating a plurality of bins for each image sensor, such that each bin represents a range of intensity values for electromagnetic radiation; assigning each pixel in a given image sensor into one of the plurality of bins; and counting, for a given image sensor, a number of pixels classified in each of the plurality of bins. To identify an occlusion, pixel counts for corresponding bins amongst the different image sensors are compared and a determination is made as to how many of the corresponding bins have substantially same pixel count. When the number of corresponding bins having substantially same pixel counts exceeds a threshold, an occlusion on the lens is identified.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
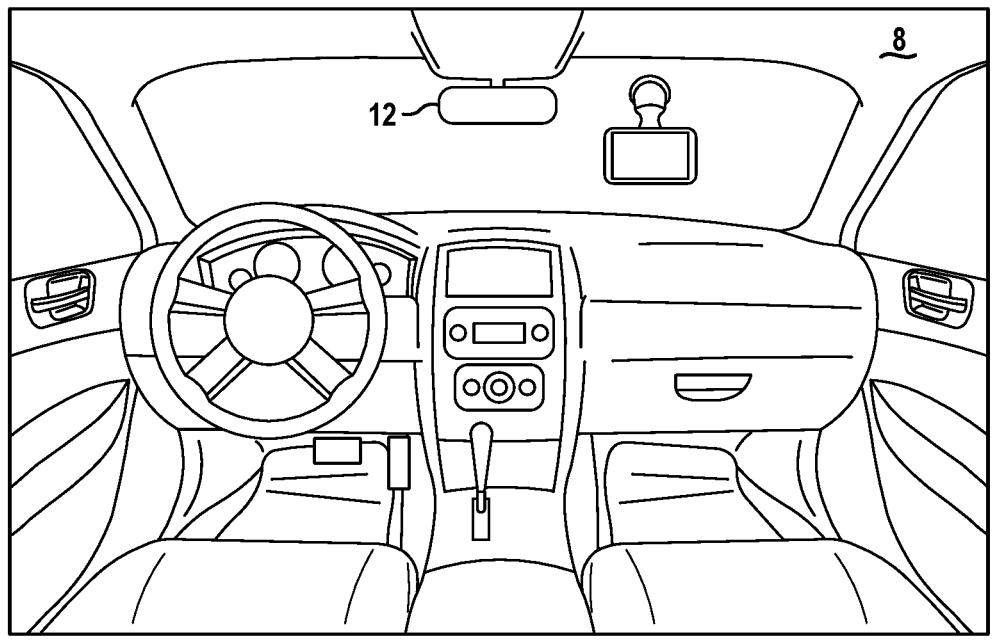
FIG. 1 is a diagram illustrating of a portion of a vehicle.

FIG. 1 illustrates a camera 12 installed in a vehicle 8. The camera 12 may be part of a driver assistance system, an autonomous vehicle control system or another vision aided system. The camera 12 operates to capture images of a scene surrounding the vehicle. In one aspect, the images captured by the camera may be used to detect near-field occlusions on the camera as will be further described below. While the camera 12 is depicted in the context of a vehicle, the techniques for detecting occlusions are applicable to cameras in other applications as well. The technique for detecting occlusions is also applicable to other types of imaging devices.

Figure 2:
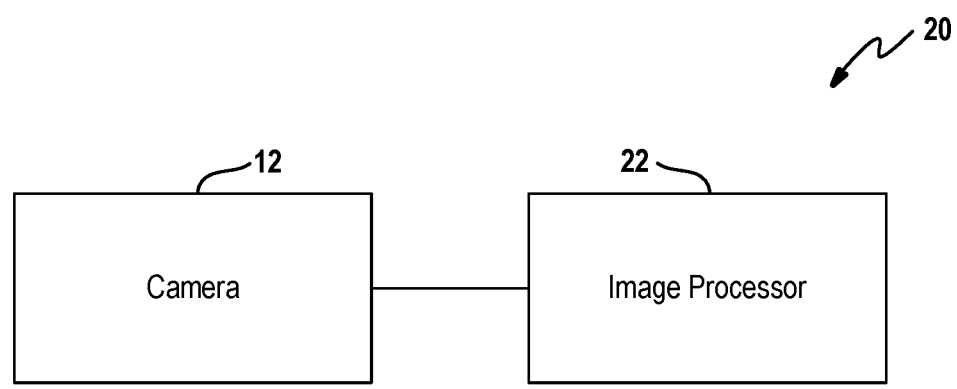
FIG. 2 is a diagram depicting an example system for detecting near-field occlusions on a camera.

FIG. 2 depicts a system 20 for detecting near-field occlusions on an exterior lens of a camera 12. The system 20 includes a camera 12 and an image processor 22. The camera 12 is preferably a color camera. That is, the camera is configured to separate the electromagnetic radiation into two or more mutually distinct frequency bands and capture the electromagnetic radiation in each frequency band with a different image sensor. In an example embodiment, the camera is a Logitech C920 Pro webcam although other types of camera are envisioned by this disclosure.

In an example embodiment, the image processor 22 is a specialized digital signal processor. It should be understood that the logic for the control of image processor 22 can be implemented in hardware logic, software logic, or a combination of hardware and software logic. In this regard, image processor 22 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that image processor 22 performs a function or is configured to perform a function, it should be understood that image processor 22 is configured to do so with appropriate logic (such as in software, logic devices, or a combination thereof).

The problem of whether or not an observed image suffers from near field occlusion can be formulated as a hypothesis testing problem:

$$Y_{ij} = X_{ij} + W_{ij}\, 1 \leq i \leq M, 1 \leq j \leq N \qquad H_1:$$

$$Y_{ij} = W_{ij}\, 1 \leq i \leq M, 1 \leq j \leq N \qquad H_0:$$

where $H_1$ is the hypothesis that the observed color image $Y=[Y_R, Y_G, Y_B]$ is the sum of a non-occluded color scene image $X=[X_R, X_G, X_B]$ and color sensor noise $W=[W_R, W_G, W_B]$, whereas $H_0$ is the null hypothesis that the observed image Y is only the sensor noise W (because scene image X is occluded). The size of all the color images are (R, G, B) colors/pixel×(M rows×N columns) pixels. M and N could denote all or a portion of a color image.

Given an observed color image Y the problem is to decide if that observation came under hypothesis $H_1$ or $H_0$? Meaning, decide if there an underlying non-occluded color scene image X in the observed color image Y or not? This decision is henceforth refer to as $Y \to H_0$ vs. $H_1$ For a general solution, let $C_{10}$ be the cost of deciding that the observation Y came under hypothesis $H_1$ when $H_0$ hypothesis is true, and $C_{01}$ the converse. Similarly, let $C_{11}$ be the cost of deciding hypothesis $H_1$ when $H_1$ hypothesis is indeed true, and $C_{00}$ be the cost of deciding hypothesis $H_0$ when $H_0$ hypothesis is indeed true.

The expected cost of any decision $Y \to H_0$ vs. $H_1$ is given by:

$$E\{C\} = \sum_{k=0}^{1} \sum_{l=0}^{1} C_{kl} \times P(Y \to H_k \mid H_l \text{ is true}) \times P(H_l \text{ is true})$$

An optimal decision $Y \to H_0$ vs. $H_1$ is one that minimizes $E\{C\}$.

The problem with this general solution is that it is only tractable (i.e., the mapping $Y \to H_0$ vs. $H_1$ can be described algorithmically) if the designer makes certain assumptions, namely, that the information regarding X and W is known a priori.

This disclosure discovers a decision process $Y \to H_0$ vs. $H_1$ under the most scant a priori information regarding X and W. The key to the decision process is that it reduces the high-dimensional decision process $Y \to H_0$ vs. $H_1$ into merely a three-dimensional decision process $y \to H_0$ vs. $H_1$ as explained in the following paragraphs.

Let $w=[w_R, w_G, w_B]$ be an identically distributed (id) random process—an assumption that is most reasonable given that it represents sensor noise. Let $x=[x_R, x_G, x_B]$ be the statistical opposite of w, namely, that x is not an identically distributed random process—an assumption that is most reasonable given that it presents incoming RGB intensity of an arbitrary scene.

Under these assumptions, the decision process $Y \to H_0$ vs. $H_1$ reduces to deciding if $y=[y_R, y_G, y_B]$ is id or not. If it is indeed id then the decision is $H_0$ (observed image is occluded), otherwise the decision is $H_1$ (observed image is not occluded).

In one embodiment, the test for whether y is id or not is based on estimating the marginal probability density functions (pdfs) of $y_R$, $y_G$, and $y_B$, respectively and comparing them. If the pdfs are similar, then $y=[y_R, y_G, y_B]$ is id and therefore the decision is $H_0$; otherwise, $y=[y_R, y_G, y_B]$ is not id and therefore the decision is $H_1$. The marginal pdf $p_{y_R}(\alpha)$ is estimated from the intensity histogram of $Y_R$ and similarly the marginal pdf $p_{y_G}(\beta)$ from the intensity histogram of $Y_G$ and the marginal pdf $p_{y_B}(\gamma)$ from the intensity histogram of $Y_B$.

Figure 3:
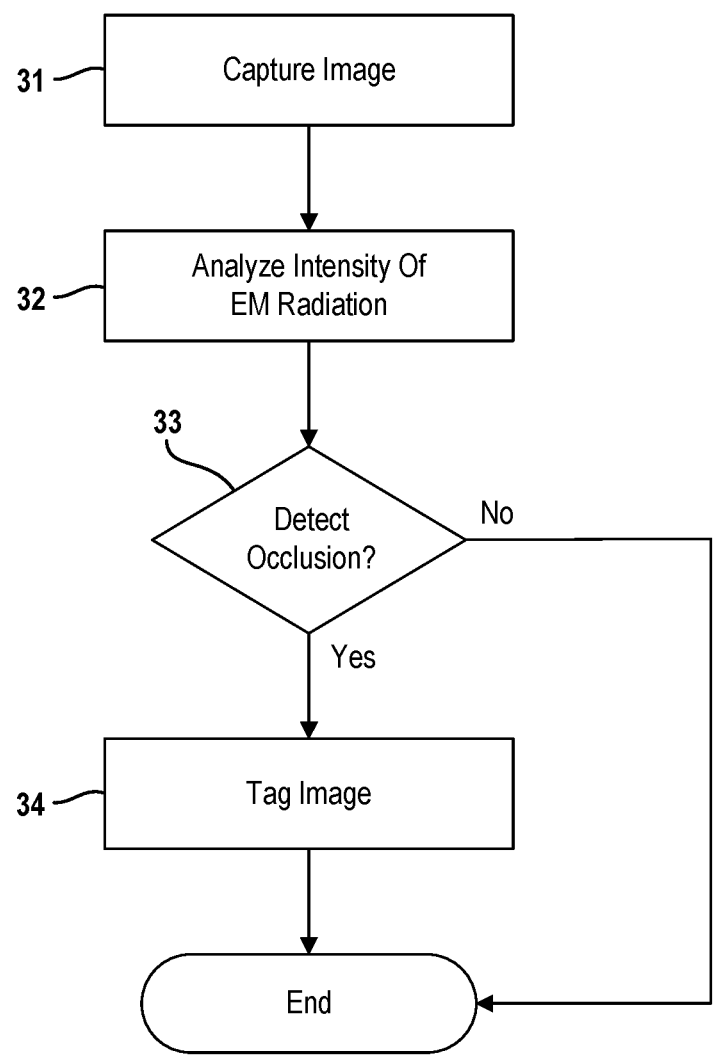
FIG. 3 is a flowchart depicting an example method for detecting near-field occlusions in images captured by a camera.

FIG. 3 further illustrate an example method for detecting near-field occlusions in images captured by a camera. To start, at least one image of a scene is captured at 31 by a camera. In an example embodiment, the electromagnetic radiation projected by the scene is separated into two or more mutually distinct frequency bands and each frequency band is captured by a different image sensor of the camera. For example, the electromagnetic radiation may be from the visible spectrum, such that a first image sensor captures electromagnetic radiation in a frequency band corresponding to color red, a second image sensor captures electromagnetic radiation in a frequency band corresponding to color blue, and a third image sensor captures electromagnetic radiation in a frequency band corresponding to color green. Such arrangements are commonly found in color cameras. In another example, the electromagnetic radiation from the visible spectrum is captured by one image sensor and electromagnetic radiation from the infrared spectrum (outside of the visible spectrum) is captured by another image sensor. Capturing electromagnetic radiation in other frequency bands with other image sensor arrangements is also contemplated by this disclosure.

Intensity of the electromagnetic radiation forming the image is analyzed at 32 across the electromagnetic spectrum. More specifically, the intensity of electromagnetic radiation in one frequency band is compared to the intensity of electromagnetic radiation in the other two frequency bands. When the intensity of electromagnetic radiation in the one frequency band is similar to the intensity of electromagnetic radiation in the other two frequency bands, the image is deemed to have a near field occlusion. In this case, the image can be tagged at 34 with an indicator of the occlusion. Other actions for handling occluded images (e.g., discarding occluded images) are also contemplated by this disclosure.

On the other hand, when the intensity of electromagnetic radiation in the one frequency band is different from the intensity of electromagnetic radiation in the other two frequency bands, no near field occlusions are found in the image.

Different methods for assessing similarity between frequency bands are contemplated by this disclosure. Generally, the intensity of the electromagnetic radiation in each of the frequency bands is first quantified and then a difference is computed between the quantified intensities for each frequency band. When the difference in the quantified intensities for the different frequency bands are less than a predetermined threshold, the image is deemed to have an occlusion.

Figure 4:
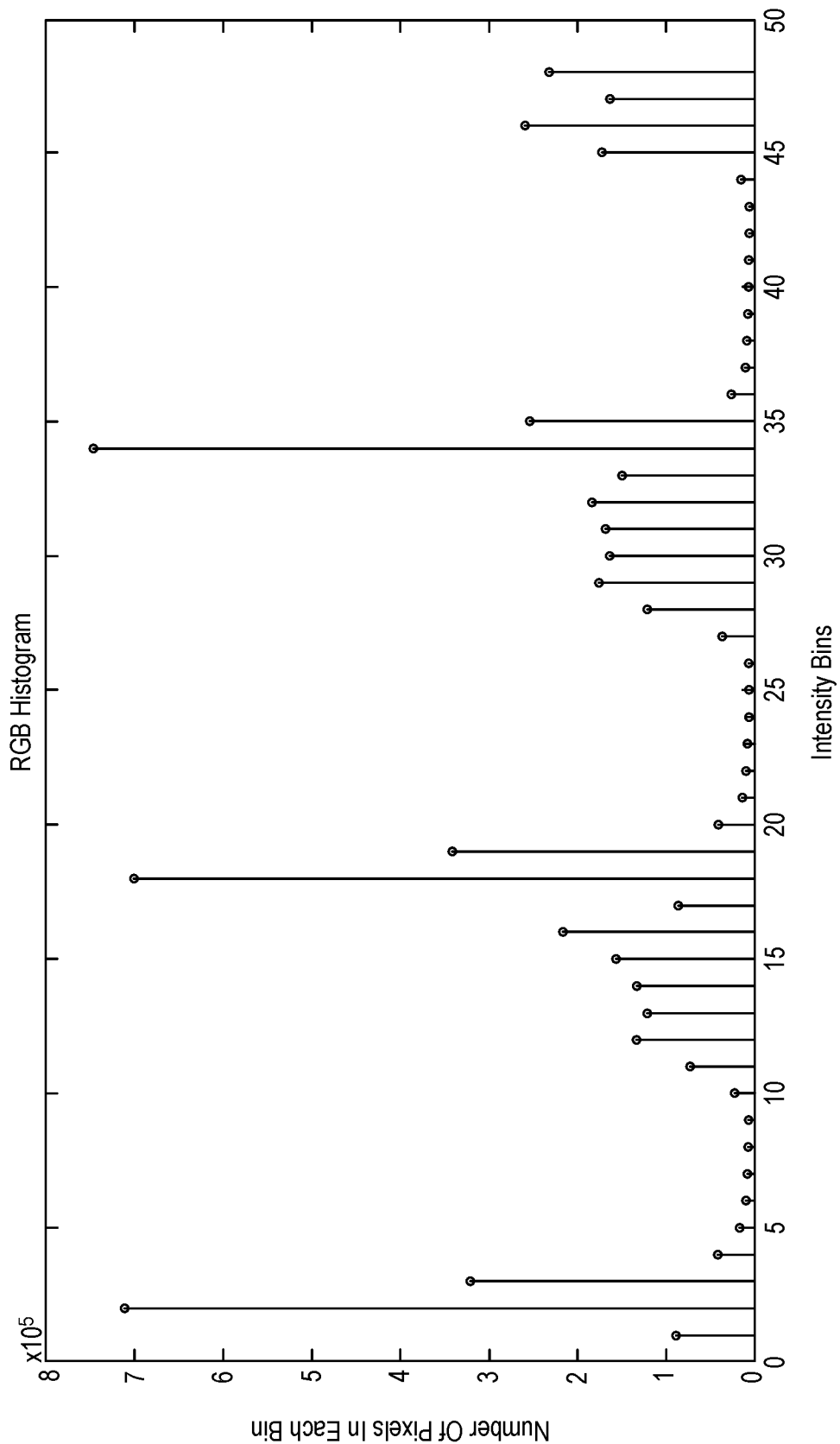
FIG. 4 is a histogram constructed from intensity values of electromagnetic radiation captured by an image sensor.

An example embodiment for analyzing electromagnetic radiation intensity is further described in relation to FIGS. 4 and 5. In this example, a histogram is constructed based on the intensity of the electromagnetic radiation for each pixel of a given image sensor as seen in FIG. 4. Each bin of the histogram represents a range of intensity values for electromagnetic radiation. In one example, the histogram is divided into 50 bins although more or less bins are contemplated by this disclosure.

Figure 5:
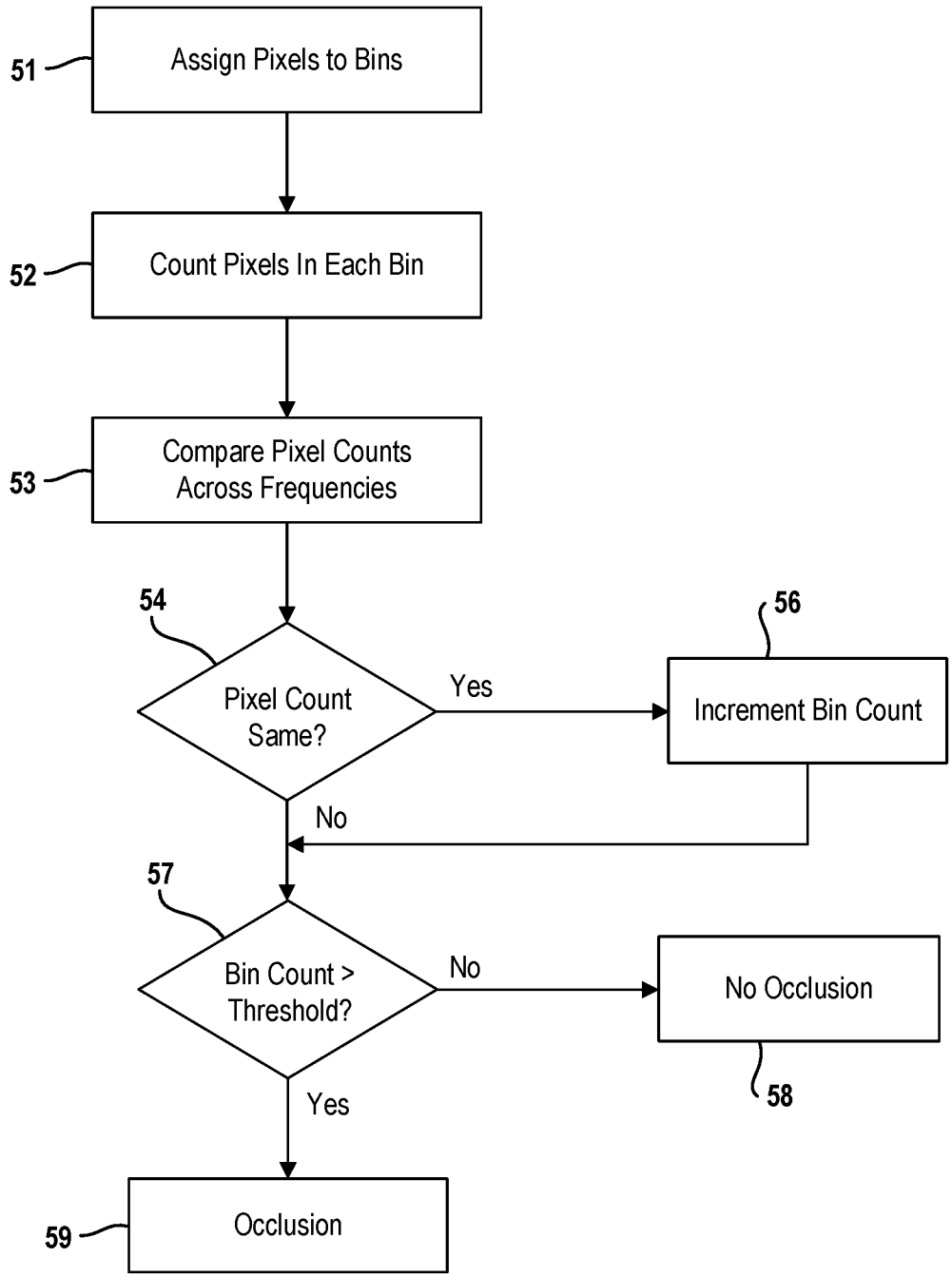
FIG. 5 is a flowchart depicting an example method for analyzing electromagnetic radiation intensity.

With reference to FIG. 5, each pixel in a given image sensor is first assigned at 51 to one of the plurality of bins defining the histogram based on the intensity value of the corresponding pixel. That is, a histogram is generated from the electromagnetic radiation captured in each of the frequency bands. In this case of a color camera, a histogram is constructed for the red image sensor, a histogram is constructed for the blue image sensor and a histogram is constructed for the green image sensor.

To compare histograms, a number of pixels classified in each of the bins of the histogram are counted at 52 for each image sensor. Pixel counts for corresponding bins are then compared at 53 amongst the different image sensors. For example, pixel count for bin 1 of the histogram for the red image sensor is compared to pixel count for bin 1 of the histogram for the blue image sensor and to the pixel count for bin 1 of the green image sensor. Pixel count for bin 2 of the histogram for the red image sensor is compared to pixel count for bin 2 of the histogram for the blue image sensor and to the pixel count for bin 2 of the green image sensor and so forth.

The number of bins having the same or substantially the same pixel count are tracked in a bin count. In the case of two frequency bands (or two image sensors), the bin count is incremented at 56 if the pixel count for a given bin in one frequency band is the same or substantially the same (e.g., within 5% variance) as the pixel count for the corresponding bin in the other frequency band. If there is more than two sensors, the bin count is incremented only if the pixel counts for all of the sensors are the same or substantially the same. In this way, the bin count indicates how many corresponding bins have substantially the same pixel count.

Bin count is then compared to a threshold as indicated at 57. When the bin count exceeds a predetermined threshold (e.g., 80% of the bins), the intensity of the electromagnetic radiation is similar amongst the image sensors and the image is deemed at 59 to have a near field occlusion. When the bin count is less than the threshold, the intensity of the electromagnetic radiation differs amongst the image sensors such that the image is deemed at 58 without at occlusion In another embodiment, the image can be divided into a plurality of blocks (e.g., six). The block may be the same size or different sizes. A histogram is constructed for each block in the manner set forth above. A determination of similarity is then made for each block in the manner described above. That is, when the bin count for a given block exceeds a predetermined threshold, the intensity of the electromagnetic radiation is similar within the given block. In this case, an image is deemed to have a near field occlusion only when the number of similar blocks exceeds a threshold. For example, if five of six blocks are determined to be similar in intensity, then the image is deemed to have a near field occlusion.

In alternative embodiment, a histogram can serve as a model in a classifier and images are classified using machine learning. As described above, a histogram is constructed from the intensity values of the electromagnetic radiation captured by each pixel of a given image sensor, where each bin of the histogram represents a range of intensity values for electromagnetic radiation. In one example, the histogram includes sixteen (16) bins for each color (i.e., red, green and blue) for a total of 48 bins. Other types of models derived from intensity values are also contemplated by this disclosure.

In an example embodiment, models are constructed for the histogram of a clean image (i.e. no occlusions) as well as histograms for images with different types of debris, such as dirt, dust, ice, snow, rain, fog, etc. Hundreds of images can be used to train the models. All images for training were selected at random in order to maintain diversity within the training set. In the example embodiment, support vector machines are used although other types of supervised learning models are contemplated as well.

During operation, a new image is captured by a camera. The histogram of the new image is then compared by a classifier with the histogram of each of the trained models. For each trained model, the classifier outputs a confidence level. Based on the confidence levels, the new image can be classified as being clean or as having a particular type of occlusion. That is, the new image is classified according to the trained model having the highest confidence level. The classifier may enforce a minimum confidence level. The new image is only classified if at least one of the trained models produces a confidence level which exceeds the minimum confidence level.

In a variant of this embodiment, models having different resolutions can be used to classify images. For example, a first set of models can be constructed based on a histogram with 48 bins, a second set of models can be constructed based on a histogram with 192 bins and a third set of models can be constructed based on a histogram with 768 bins. A new image is then classified using each set of models and tagged with an indicator corresponding to the model produced the highest confidence level.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting occlusions on a color camera, comprising:
   capturing, by the camera, an image of a scene, where electromagnetic radiation captured by the camera is captured in at least two mutually distinct frequency bands;
   comparing, by an image processor, intensity of electromagnetic radiation in one frequency band to intensity of electromagnetic radiation in another frequency band, where the one frequency band is distinct from the another frequency band and the electromagnetic radiation for the one frequency band is taken from same image as the electromagnetic radiation for the another frequency band; and
   detecting, by the image processor, an occlusion on a lens of the camera when the intensity of the electromagnetic radiation in the one frequency band is similar to the intensity of the electromagnetic radiation in the another frequency band.

2. The method of claim 1 wherein capturing an image includes separating the electromagnetic radiation into three mutually distinct frequency bands and capturing each frequency band with a different image sensor.

3. The method of claim 1 further comprises detecting an occlusion on the lens by quantifying the intensity of the electromagnetic radiation in each of the frequency bands, computing a difference in the intensity of the electromagnetic radiation between the frequency bands and tagging the image with an indicator of an occlusion in response to the difference being less than a threshold.

4. The method of claim 1 further comprises comparing the intensity of electromagnetic radiation by designating a plurality of bins for each image sensor, such that each bin represents a range of intensity values for electromagnetic radiation; assigning each pixel in a given image sensor into one of the plurality of bins; and counting, for a given image sensor, a number of pixels classified in each of the plurality of bins.

5. The method of claim 4 further comprises comparing pixel counts for corresponding bins amongst the different image sensors, determining how many of the corresponding bins have substantially same pixel count, and identifying an occlusion on the lens when the number of corresponding bins having substantially same pixel counts exceeds a threshold.

6. The method of claim 1 further comprises
   constructing a clean model for an image captured by the camera without an occlusion;
   constructing additional models for an image captured by the camera, where each additional model is for an image captured by the camera having a different type of occlusion thereon;
   classifying, by machine learning, the image using the clean model and the additional models.

7. A system for detecting occlusions on a color camera, comprising:
   a camera configured to capture an image of a scene, where electromagnetic radiation captured by the camera is captured in at least two mutually distinct frequency bands; and
   an image processor in data communication with the camera, wherein the image processor analyzes intensity of electromagnetic radiation by comparing the intensity of electromagnetic radiation in one frequency band to the intensity of electromagnetic radiation in another frequency band, where the one frequency band is distinct from the another frequency band and the electromagnetic radiation for the one frequency band is taken from same image as the electromagnetic radiation for the another frequency band, and detects an occlusion of the lens of the camera when the intensity of electromagnetic radiation in the one frequency band is similar to the intensity of electromagnetic radiation in the another frequency band.

8. The system of claim 7 wherein the camera is further defined as a color camera.

9. The system of claim 7 wherein the image processor compares the intensity of electromagnetic radiation by designating a plurality of bins for each image sensor, such that each bin represents a range of intensity values for electromagnetic radiation; assigning each pixel in a given image sensor into one of the plurality of bins; and counting, for a given image sensor, a number of pixels classified in each of the plurality of bins.

10. The system of claim 9 wherein the image processor compares pixel counts for corresponding bins amongst the different image sensors, determines how many of the corresponding bins have substantially same pixel count, and identifies an occlusion on the lens when the number of corresponding bins having substantially same pixel counts exceeds a threshold.

11. A method for detecting occlusions on a color camera, comprising:
- capturing, by the camera, an image of a scene, where electromagnetic radiation captured by the camera is captured in at least two mutually distinct frequency bands;
- comparing, by an image processor, intensity of electromagnetic radiation in one frequency band to intensity of electromagnetic radiation in another frequency band by designating a plurality of bins for each image sensor, such that each bin represents a range of intensity values for electromagnetic radiation; assigning each pixel in a given image sensor into one of the plurality of bins; and counting, for a given image sensor, a number of pixels classified in each of the plurality of bins; and
- detecting, by the image processor, an occlusion on a lens of the camera when the intensity of the electromagnetic radiation in the one frequency band is similar to the intensity of the electromagnetic radiation in the another frequency band.

12. The method of claim 11 further comprises comparing pixel counts for corresponding bins amongst the different image sensors, determining how many of the corresponding bins have substantially same pixel count, and identifying an occlusion on the lens when the number of corresponding bins having substantially same pixel counts exceeds a threshold.

13. The method of claim 11 further comprises detecting an occlusion on the lens by quantifying the intensity of the electromagnetic radiation in each of the frequency bands, computing a difference in the intensity of the electromagnetic radiation between the frequency bands and tagging the image with an indicator of an occlusion in response to the difference being less than a threshold.

14. The method of claim 11 further comprises
- constructing a clean model for an image captured by the camera without an occlusion;
- constructing additional models for an image captured by the camera, where each additional model is for an image captured by the camera having a different type of occlusion thereon;
- classifying, by machine learning, the image using the clean model and the additional models.

* * * * *